(12) United States Patent
Berger et al.

(10) Patent No.: US 7,818,504 B2
(45) Date of Patent: Oct. 19, 2010

(54) STORAGE SYSTEM THAT PRIORITIZES STORAGE REQUESTS

(75) Inventors: Derrin M. Berger, Hyde Park, NY (US); Michael A. Blake, Wappingers Falls, NY (US); Garrett M Drapala, Poughkeepsie, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 11/861,765

(22) Filed: Sep. 26, 2007

(65) Prior Publication Data
US 2009/0083491 A1 Mar. 26, 2009

(51) Int. Cl.
*G06F 12/08* (2006.01)
(52) U.S. Cl. ............ 711/131; 711/158; 711/E12.039
(58) Field of Classification Search ........................ None
See application file for complete search history.

(56) References Cited

U.S. PATENT DOCUMENTS

| 4,292,674 | A | 9/1981 | Scheuneman | 711/3 |
|---|---|---|---|---|
| 4,916,604 | A | 4/1990 | Yamamoto et al. | 711/130 |
| 5,416,749 | A | 5/1995 | Lai | 365/240 |
| 5,465,344 | A | 11/1995 | Hirai et al. | 711/131 |
| 6,038,651 | A * | 3/2000 | VanHuben et al. | 712/21 |
| 6,134,676 | A * | 10/2000 | VanHuben et al. | 714/39 |
| 6,738,870 | B2 * | 5/2004 | Van Huben et al. | 711/150 |
| 6,738,871 | B2 * | 5/2004 | Van Huben et al. | 711/150 |
| 6,738,872 | B2 * | 5/2004 | Van Huben et al. | 711/150 |
| 6,775,741 | B2 | 8/2004 | Ebeshu et al. | 711/118 |
| 2002/0083149 | A1 * | 6/2002 | Van Huben et al. | 709/215 |
| 2002/0083243 | A1 * | 6/2002 | Van Huben et al. | 710/107 |
| 2002/0083299 | A1 * | 6/2002 | Van Huben et al. | 712/29 |
| 2002/0103959 | A1 | 8/2002 | Baker, Jr. et al. | 711/103 |

* cited by examiner

*Primary Examiner*—Kevin Verbrugge
(74) *Attorney, Agent, or Firm*—John E. Campbell; Ido Tuchman

(57) ABSTRACT

A storage system may include storage, a main pipeline to carry data for the storage, and a store pipeline to carry data for the storage. The storage system may also include a controller to prioritize data storage requests for the storage based upon available interleaves and which pipeline is associated with the data storage requests.

22 Claims, 3 Drawing Sheets

STORAGE SYSTEM THAT PRIORITIZES STORAGE REQUESTS

FIELD OF THE INVENTION

The invention relates to the field of computer systems, and, more particularly, to storage in computer systems and related methods.

BACKGROUND OF THE INVENTION

In multiprocessor systems, one method for executing stores to a shared cache involves using a pipeline to perform a directory lookup in order to determine which compartment the data is to be store to and then to send this information to the cache. Once this compartment information is obtained it is possible for subsequent stores to the same line to avoid using the pipeline by using address compares and a dedicated pipeline that stores directly to the cache, thus avoiding the directory lookup and freeing up system resources.

When the cache being stored to is interleaved, additional logic is needed to model the behavior of the cache based on previous operations. The model is used to determine whether or not an operation should make a request and to avoid potential interleave conflicts.

Given an arrangement of using a cache interleave model along with both shared and dedicated store resources, additional logic to arbitrate between requests from multiple chips must be implemented. When the store logic has requests active for both pipelines, it is first necessary to ensure that any interleave conflicts will be avoided before granting either request. It is also important to make efficient use of the interleaves by allowing both pipelines to have access whenever possible. Because of this, simpler schemes may not suffice. Both pipelines should be granted access whenever possible and all conflicts should be avoided.

Unfortunately, the above systems may not effectively and efficiently meet the storage needs of a computer system.

SUMMARY OF THE INVENTION

In view of the foregoing background, it is therefore an object of the invention to provide a more efficient storage system that meets cycle time and area requirements.

This and other objects, features, and advantages in accordance with the invention are provided by a storage system that may include storage, a main pipeline to carry data for the storage, and a store pipeline to carry data for the storage. The storage system may also include a controller to prioritize data storage requests for the storage based upon available interleaves and which pipeline is associated with the data storage requests.

The controller may filter data storage requests received from the main pipeline when the data associated with the data storage requests is requested elsewhere. The controller may also rank the data storage requests for the main pipeline over the data storage requests for the store pipeline.

The controller may filter data storage requests based upon conflicts with the available interleaves. The controller may contain an interleave model based upon how the available interleaves were determined.

The controller may generate a vector for the available interleaves using the interleave model. The controller may match a portion of each data storage request's address for the main pipeline with the vector to determine how each main pipeline data storage request will be processed.

The controller may match a portion of each data storage request's address for said store pipeline with a filtered version of the vector which blocks available interleaves used by said main pipeline to determine how each store pipeline data storage request will be processed. Accordingly, a more efficient storage system is provided that will help efficiency by giving preference to requests that may have the most impact on system resources, e.g. by getting the main pipe requests out of the way.

Another aspect of the invention is a method for making a storage system. The method may include providing a main pipeline and a store pipeline to each carry data for a storage. The method may also include prioritizing data storage requests for the storage based upon available interleaves and which pipeline is associated with the data storage requests.

DETAILED DESCRIPTION OF THE PREFERRED EMBODIMENTS

Figure 1:
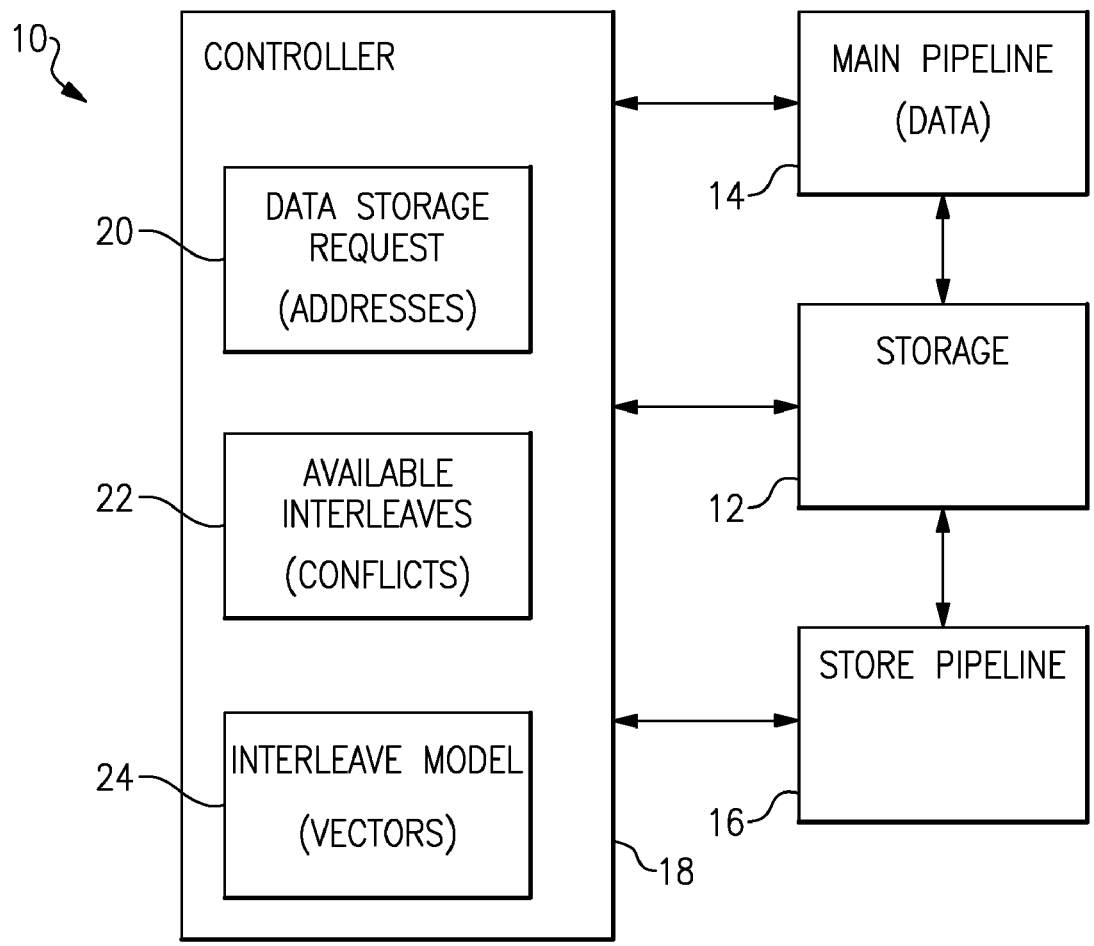
FIG. 1 is a schematic block diagram of a storage system in accordance with the invention.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring initially to FIG. 1, a storage system 10 to improve storage efficiency is initially described. The system 10 includes a storage 12, which maintains data used by a computer for some time period as will be appreciated by those of skill in the art.

The system 10 also includes a main pipeline 14 to carry data for the storage 12, and a store pipeline 16 to carry data for the storage, for example. The pipelines are each a grouping of data processing units that serve to deliver data to the storage 12 as will be appreciated by those of skill in the art. In another embodiment, at least one of the pipelines may also include buffer storage.

The system 10 further includes a controller 18 Having a processor or other logic circuitry which is connected to storage 12 as will be appreciated by those of skill in the art. In another embodiment, the storage 12 may be embedded in controller 18's processor.

The controller 18 prioritizes data storage requests 20 for the storage 12 based upon available interleaves 22 and which pipeline is associated with the data storage requests, for example. In one embodiment, the controller 18 filters the data storage requests 20 received from the main pipeline 14 when the data associated with the data storage requests is requested elsewhere.

In another embodiment, the controller 18 also ranks the data storage requests 20 for the main pipeline 14 over the data storage requests for the store pipeline 16. In other words, a more efficient storage system 10 is provided that will help efficiency by giving preference to requests that may have the most impact on system resources, e.g. by getting the main pipeline 14 requests out of the way.

The controller 18 filter data storage requests 20 based upon conflicts with the available interleaves 22, for instance. Stated another way, the controller 18 tries not to waste a selection cycle on a request that will potentially have an interleave conflict.

In one embodiment, the controller 18 contains an interleave model 24 based upon how the available interleaves 22 were determined. In another embodiment, the controller 18 generates a vector for the available interleaves 22 using the interleave model 24.

In other embodiments, the controller 18 matches a portion of each data storage request's 20 address for the main pipeline 14 with the vector to determine how each main pipeline data storage request will be processed. In another embodiment, the controller 18 matches a portion of each data storage request's 20 address for the store pipeline 16 with a filtered version of the vector which blocks available interleaves 22 used by the main pipeline 14 to determine how each store pipeline data storage request 20 will be processed. As a result, the controller 18 enables both pipelines to take full advantage of all interleaves that are available, thereby providing a more efficient storage system 10 that meets cycle time and area requirements.

Figure 2:
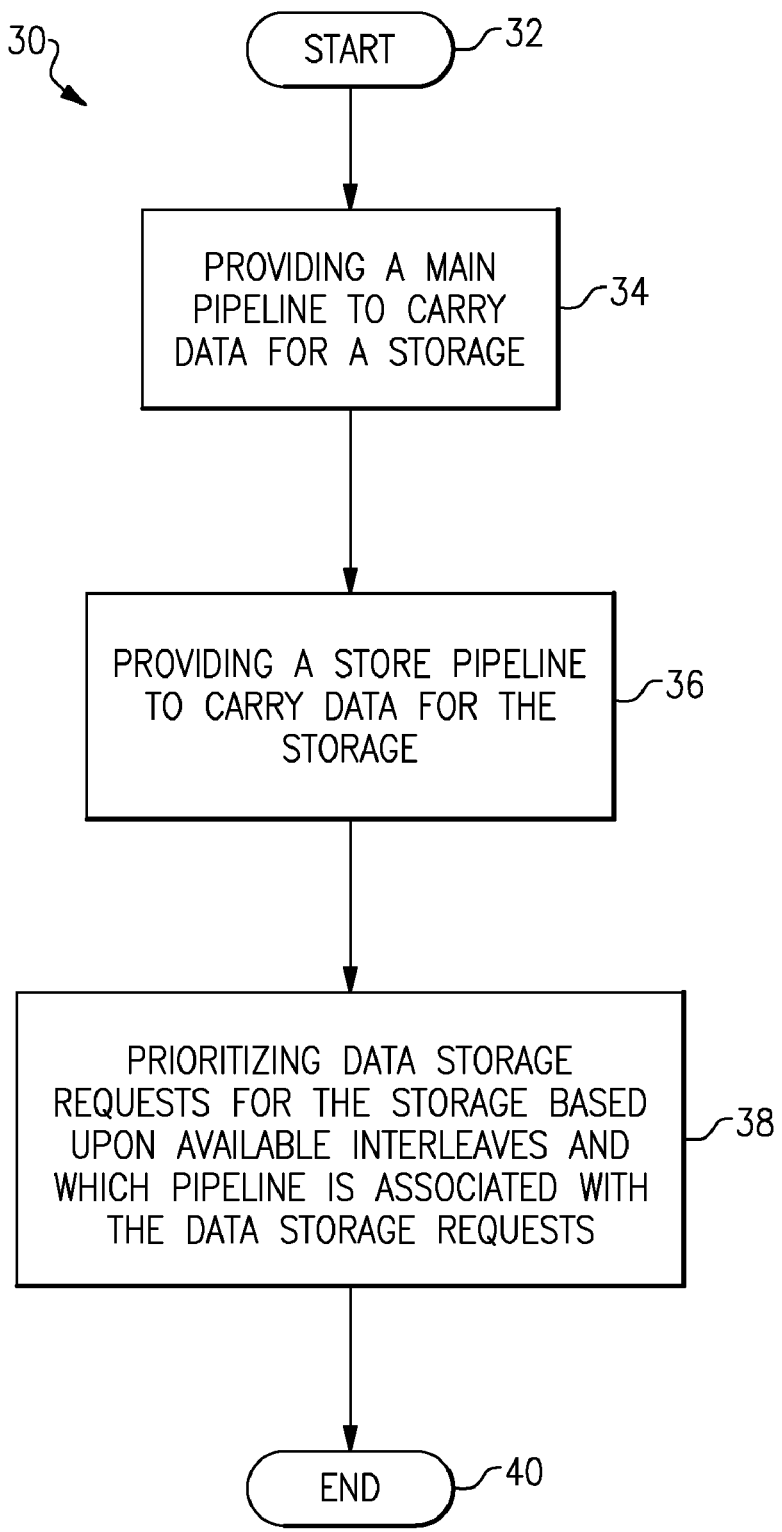
FIG. 2 is a flowchart illustrating method aspects according to the invention.

Another aspect of the invention is a method for making a storage system 10, which is now described with reference to flowchart 30 of FIG. 2. The method begins at Block 32 and may include providing a main pipeline 14 to carry data for a storage 12 at Block 34. The method may also include a store pipeline 16 to carry data for the storage 12 at Block 36. The method may further include prioritizing data storage requests 20 for the storage 12 based upon available interleaves 22 and which pipeline is associated with the data storage requests at Block 38. The method may end at Block 40.

Figure 3:
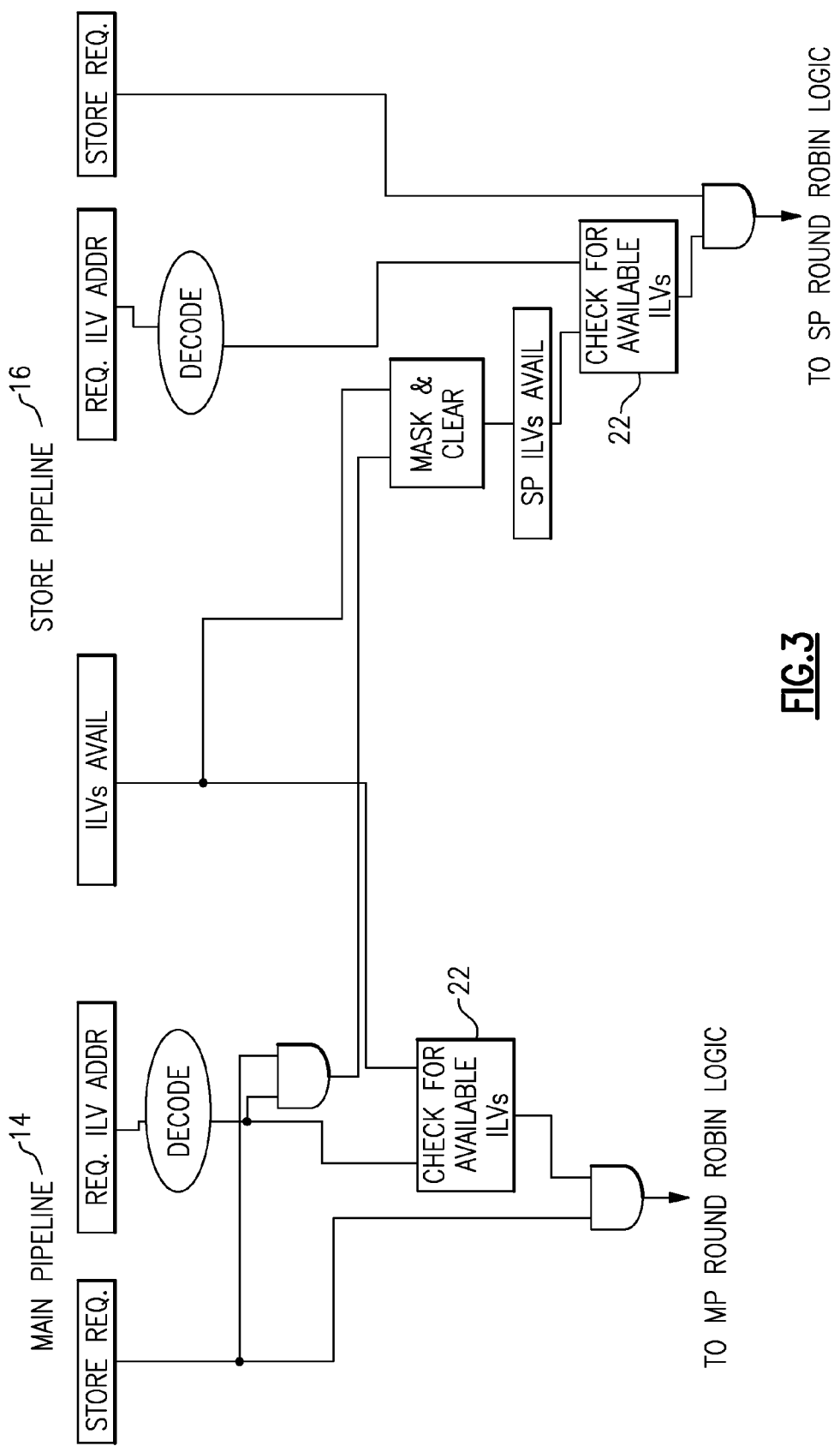
FIG. 3 is a schematic block diagram of one embodiment of the storage system in FIG. 1.

A prophetic example of how the storage system 10 may work is now described with additional reference to FIG. 3. The storage system 10 uses a scheme whereby operations are filtered from making requests based on which cache interleaves are available, giving lower priority to those that would not busy resources from other types of operations.

To make a request to the round robin arbitration logic provided by controller 18 (and ultimately the main pipeline 14 or the store pipeline 16), a processor or chip should make a data store request 20 that is not being blocked due to needs, etc., and/or does not have an interleave conflict. To alleviate timing issues, the controller 18 maintains its own version of the interleave model 24. On a given cycle, this local interleave model 24 is used to block valid main pipeline 14 data store requests 20. In parallel, all valid data store requests 20 targeting the main pipeline 14 are used to mask and block the interleaves available for the store pipeline 16.

In this embodiment, the controller 18 maintains its own version of the interleave model 24 used to either allow or block stores from making requests based on whether or not the operation will cause an interleave conflict. The output of this store interleave model 24 is a 16 bit vector of available cache interleaves 22, for example.

Each store request supplies a portion of its address, e.g. a 4-bit ILV ID, to specify which cache interleave the store is targeting. These address bits are decoded to align with the 16 bit interleave available vector from the controller 18 local interleave model 24. In order for a store to make a request (assuming it is not being blocked for another reason), it should 'hit' against the interleave model 24, meaning the target interleave should be available as indicated by the interleave model.

For the main pipeline 14, the controller 18's local interleave model 24 gives preferences to main pipeline stores. To do so, the available interleaves 22 are presented to requests for the main pipeline 14. Any valid store request for the main pipeline 14 combined with an interleave 'hit' against the available interleaves 22 qualifies for a request to the round robin arbitration logic of the controller 18 and ultimately to the main pipeline to process the store.

The store pipeline 16 uses a filtered version of the available interleaves 22 vector. The filtering is done by first building a vector of cache interleaves for which stores are making active main pipeline 14 data store requests 20, e.g. a vector of decoded interleaves ID's gated by valid main pipeline requests. This vector is used as a mask to clear the bits of the available interleaves 22 vector that should not allocated to the store pipeline 16 stores. The resulting vector is presented to the store pipeline 16 for filtering its data storage requests 20 made to the store pipeline round robin arbitration logic in the controller 18. Any valid data store request 20 for the store pipeline 16 combined with an interleave 'hit' against the filtered available interleaves 22 qualifies for a request to the round robin logic and ultimately to the store pipeline to process the store.

In this manner, only a small amount of logic is added before checking for interleaves available to the store pipeline 16. At the same time, this is a simple way to give preference to main pipeline 14 stores over store pipeline 16 stores.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A storage system comprising:
   storage;
   a main pipeline to carry data for said storage;
   a store pipeline to carry data for said storage; and
   a controller to prioritize data storage requests for said storage based upon available interleaves for said main pipeline, available filtered interleaves for said store pipeline, and which pipeline is associated with the data storage requests.

2. The storage system of claim 1 wherein said controller filters data storage requests received from said main pipeline when the data associated with the data storage requests is requested elsewhere.

3. The storage system of claim 1 wherein said controller ranks the data storage requests for the main pipeline over the data storage requests for the store pipeline.

4. The storage system of claim 1 wherein said controller filters data storage requests based upon conflicts with the available interleaves.

5. The storage system of claim 1 wherein said controller contains an interleave model based upon how the available interleaves were determined.

6. The storage system of claim 5 wherein said controller generates a vector for the available interleaves using the interleave model.

7. The storage system of claim 6 wherein said controller matches a portion of each data storage request's address for said main pipeline with the vector to determine how each main pipeline data storage request will be processed.

8. The storage system of claim 7 wherein said controller matches a portion of each data storage request's address for said store pipeline with a filtered version of the vector which blocks available interleaves used by said main pipeline to determine how each store pipeline data storage request will be processed.

9. A method of making a storage system, the method comprising:
   providing a main pipeline and a store pipeline to each carry data for a storage;
   prioritizing data storage requests for the storage based upon available interleaves for said main pipeline, available filtered interleaves for said store pipeline, and which pipeline is associated with the data storage requests.

10. The method of claim 9 further comprising filtering the data storage requests received from the main pipeline when the data associated with the data storage requests is requested elsewhere.

11. The method of claim 9 further comprising ranking the data storage requests for the main pipeline over the data storage requests for the store pipeline.

12. The method of claim 9 further comprising filtering the data storage requests based upon conflicts with the available interleaves.

13. The method of claim 9 further comprising generating a vector for the available interleaves using an interleave model based upon how the available interleaves were determined.

14. The method of claim 13 further comprising matching a portion of each data storage request's address for the main pipeline with the vector to determine how each main pipeline data storage request will be processed.

15. The method of claim 14 further comprising matching a portion of each data storage request's address for the store pipeline based upon a filtered vector which blocks available interleaves used by the main pipeline to determine how each store pipeline data storage request will be processed.

16. A computer program product embodied in a tangible media comprising:
   computer readable program codes coupled to the tangible media for a method of making a storage system, the computer readable program codes configured to cause the program to:
   communicate with a main pipeline and a store pipeline that each carries data for storage;
   prioritize data storage requests for the storage based upon available interleaves for said main pipeline, available filtered interleaves for said store pipeline, and which pipeline is associated with the data storage requests.

17. The computer program product of claim 16 further comprising program code configured to: filter the data storage requests received from the main pipeline when the data associated with the data storage requests is requested elsewhere.

18. The computer program product of claim 16 further comprising program code configured to: rank the data storage requests for the main pipeline over the data storage requests for the store pipeline.

19. The computer program product of claim 16 further comprising program code configured to: filter the data storage requests based upon conflicts with the available interleaves.

20. The computer program product of claim 16 further comprising program code configured to: generate a vector for the available interleaves using an interleave model based upon how the available interleaves were determined.

21. The computer program product of claim 20 further comprising program code configured to: match a portion of each data storage request's address for the main pipeline with the vector to determine how each main pipeline data storage request will be processed.

22. The computer program product of claim 21 further comprising program code configured to: match a portion of each data storage request's address for the store pipeline based upon a filtered vector which blocks available interleaves used by the main pipeline to determine how each store pipeline data storage request will be processed.

* * * * *